April 20, 1965  T. B. HOWE  3,178,928
ROLLING BEARING SIMULATOR
Filed Aug. 29, 1961  3 Sheets-Sheet 1

INVENTOR.
THOMAS B. HOWE
BY
ATTORNEY

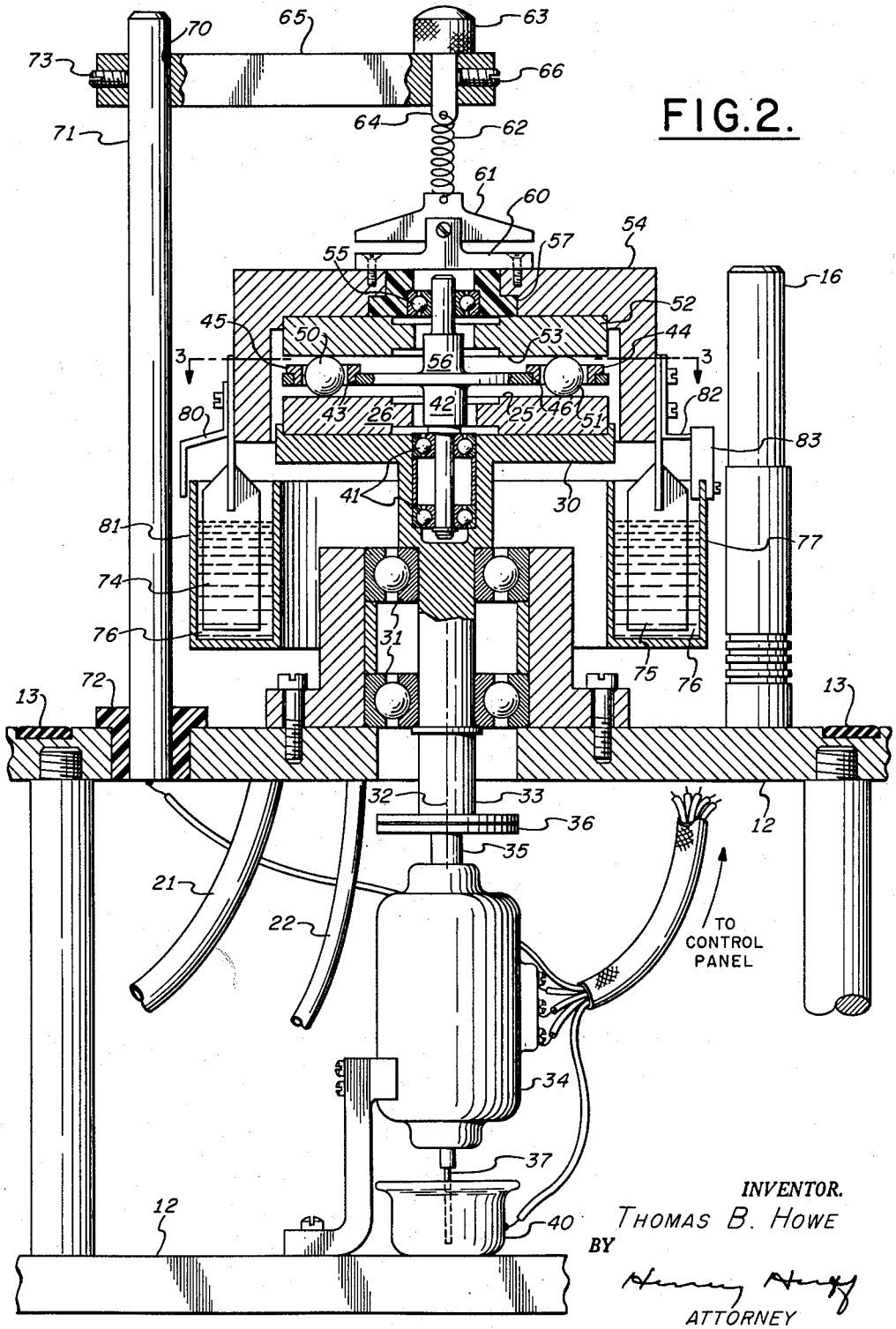

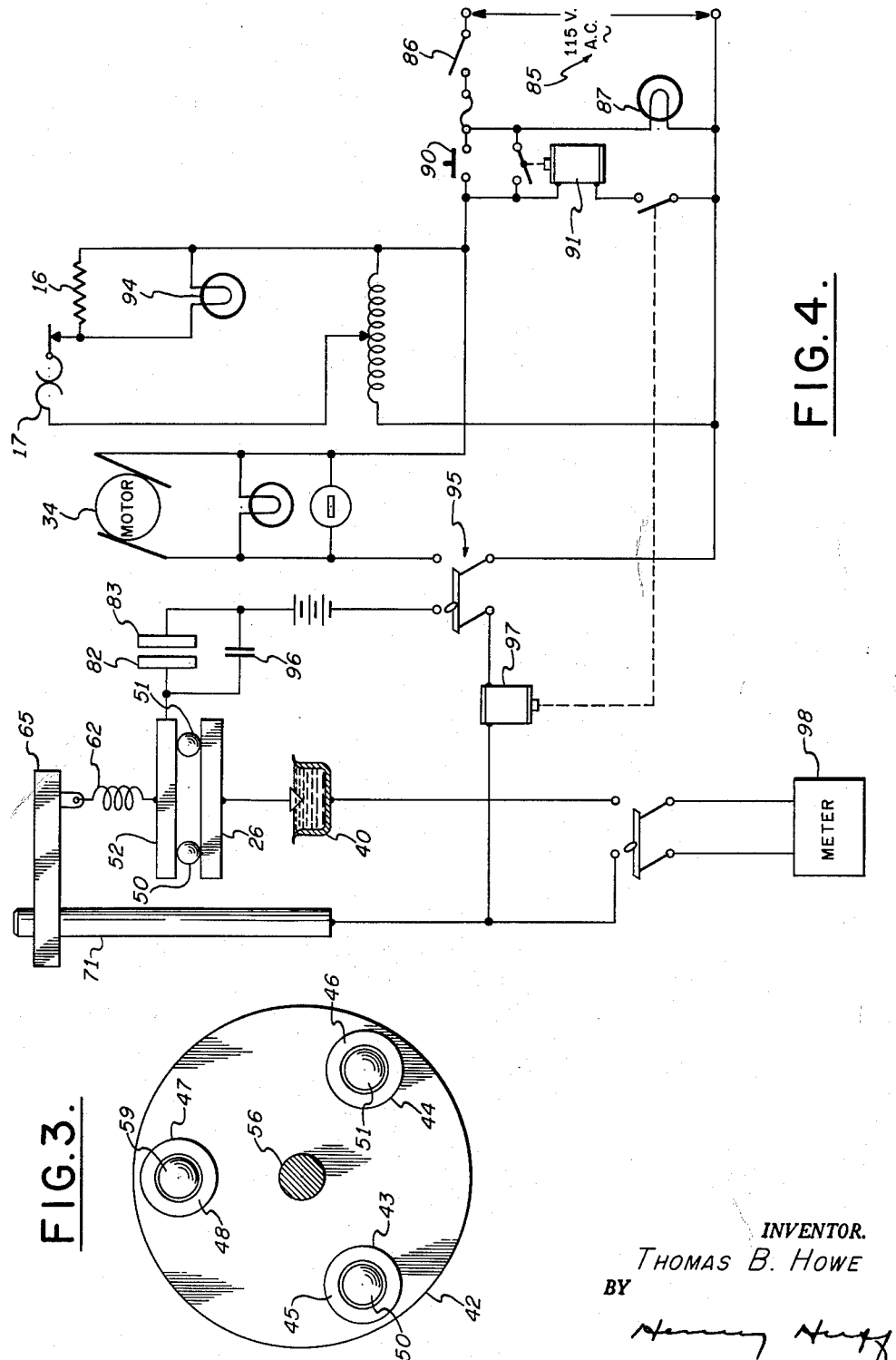

United States Patent Office 3,178,928
Patented Apr. 20, 1965

3,178,928
ROLLING BEARING SIMULATOR
Thomas B. Howe, Greenlawn, N.Y., assignor to Sperry Rand Corporation, Great Neck, N.Y., a corporation of Delaware
Filed Aug. 29, 1961, Ser. No. 134,773
17 Claims. (Cl. 73—9)

This invention relates to a device for simulating the operation of rolling bearings and it is particularly useful in the study of precision ball bearings as well as the elements, materials and lubrication thereof.

The device of the present invention can be adapted to simulate the important parameters of a particular ball bearing element, ball bearing or class of ball bearings. Simulation of this nature assures the validity of the test results for a specified set of conditions rather than for some other set of arbitrarily selected set of conditions as is the case in a non-simulated test.

Prior art apparatus endeavor to simulate certain important parameters by conducting tests directly upon the composite ball bearing unit. The present device provides a number of advantages over the prior art devices including:

(1) True simulation of environmental conditions.
(2) Accurate measurements of torque and electrical resistance provide a constant indication of operating efficiency.
(3) Simple geometric shapes of the cooperating test parts facilitate microscopic inspection and economical testing.
(4) Interchangeability of bearing components to accurately simulate bearing materials normally used.

The present device can accurately simulate the following bearing parameters:

(1) Contact pressure of the bearing ball on the associated race.
(2) Rubbing speed of the ball on the separator cage.
(3) Ratio of roll to spin of the balls.
(4) Temperature.
(5) Atmosphere.
(6) Method and quantity of lubrication.

The present device further provides data outputs representative of the torque transmitted through the ball elements as well as the electrical resistance through the lubricating film associated with the ball elements. Changes in efficiency of the simulated bearing are indicated by rising and/or erratic torque or electrical resistance indications which can be utilized to predict failure considerably in advance of the actual occurrence of such failure. This combined with the ability to control the quantity of available lubricant provides the basis for life tests of short duration without sacrificing the validity of the test results thus obtained.

The test parts of the present invention comprise the spherical ball bearing elements which cooperate with flat race-simulating surfaces with the ball elements retained in a separator disc having a plurality of bushings therein each adapted to receive one of the ball bearing elements. The simple geometry of the test parts, particularly the flat race-simulating members, permits economical manufacture of the test parts from a variety of materials with relatively simple tools. It also permits easy disassembly for observation at any time during a test run. The flat race-simulating surface and the separator disc bushings are readily interchangeable respectively to simulate actual bearing materials and lubrication methods. The ease of disassembly as well as the large size of the flat surface of the race-simulating members facilitates microscopic inspection and photographing of the wear tracks, lubricant residues, etc., to a degree that is impossible in an actual ball bearing, even one that has been dismantled for inspection purposes.

It is a primary object of the present invention to provide a device that accurately simulates the important parameters of a rolling bearing.

An additional object of the present invention is to provide a device which simulates the parameters of a rolling bearing which is economical to manufacture and has inexpensive, readily interchangeable test portions.

It is a further object of the present invention to provide a device which simulates the important parameters of a rolling bearing and provides a plurality of output measures suitable for forecasting bearing failures.

Another object of the present invention is to provide a method of simulating loading bearing operation for forecasting bearing operation.

The above objects are achieved by the present invention which has first and second spaced race-simulating surfaces between which a plurality of rolling bearing elements are disposed contiguous with respect to the surfaces. A rolling element retaining means is disposed between and in spaced relation with respect to the first and second race-simulating surfaces and is adapted to receive a plurality of the rolling bearing elements. The first surface rests upon the rolling elements which in turn rest upon the second surface. The surfaces and the retaining means are mounted for rotation about a common axis. A motor rotates the second surface thereby transmitting a torque through the rolling elements to the second surface. The second surface has means responsive to the transmitted torque for providing a measure in accordance therewith. Means are also associated with the first and second surfaces for providing a signal respresentative of the electrical resistance through the first and second surfaces and the rolling elements. The signals representative of the torque and the electrical resistance are utilized to forecast the bearing life.

Referring now to the drawings,

FIG. 2 is a sectional view taken along lines 2—2 of FIG. 1;

FIG. 3 is a top view of a separator disc taken along lines 3—3 of FIG. 2; and

FIG. 4 is a schematic wiring diagram of the control circuit of the ball bearing simulator of FIG. 1.

Figure 1:
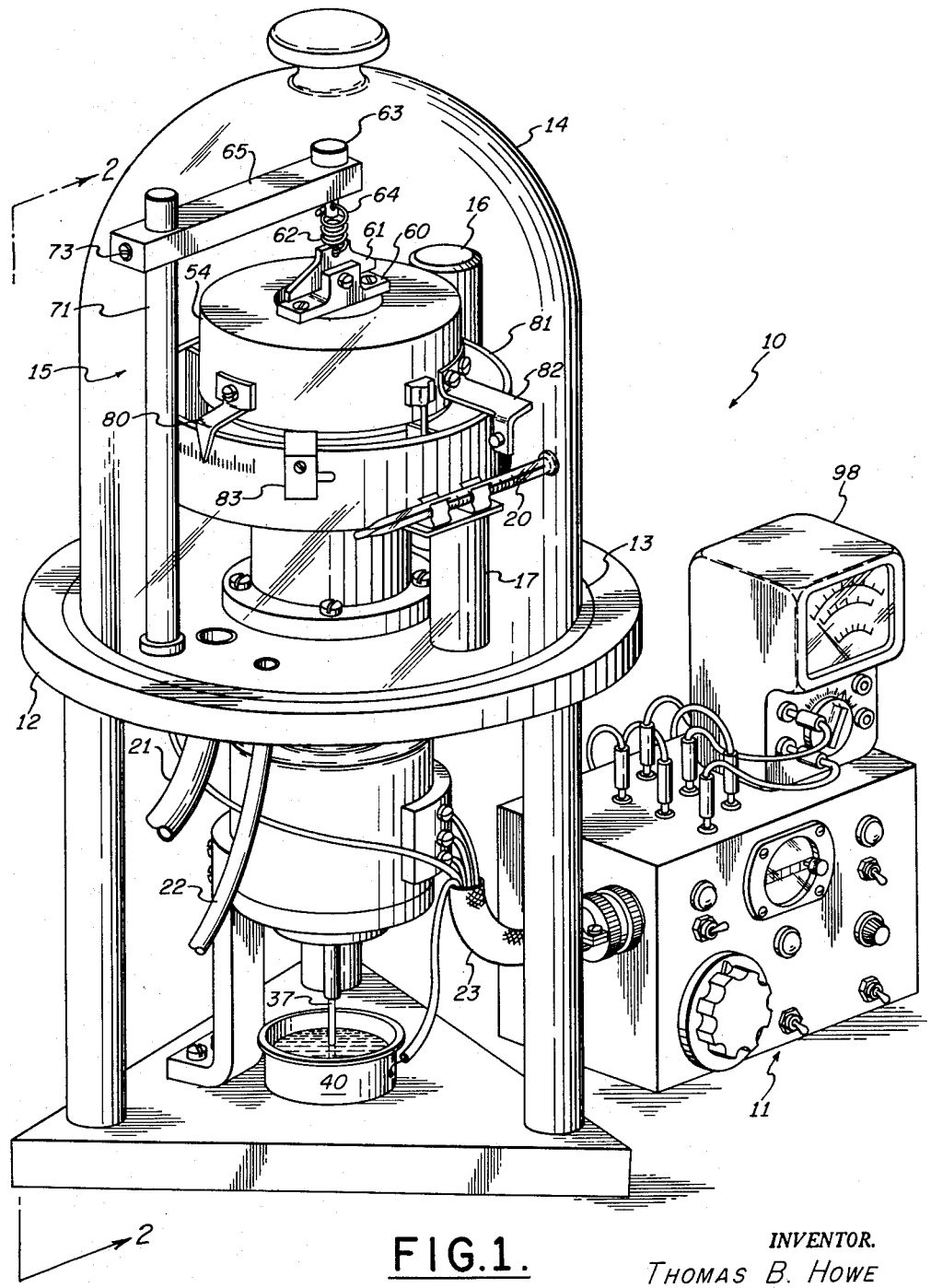
FIG. 1 is a front view of a ball bearing simulator including a control panel.

The present invention will be described with respect to a device which simulates the operation of a ball bearing for purposes of example, it being understood that the invention is equally adapted to simulate the operation of other types of rolling bearings.

FIG. 1 shows a ball bearing simulator 10 including a control panel 11. The ball bearing simulator 10 includes a frame 12 which has a gasket 13 mounted thereon. The frame 12 and the gasket 13 cooperate with a bell jar 14 to provide an enclosure 15 for the critical elements of the ball bearing simulator 10.

The temperature within the enclosure 15 is controlled to simulate temperatures that might be experienced under actual operating conditions of the ball bearing by means of heaters 16 which are regulated by a thermostat 17. An indication of the temperature within the enclosure 15 is provided by a thermometer 20. Supply and exhaust conduits 21 and 22 respectively are connected to the interior of the enclosure 15 to provide the desired atmosphere such as helium, nitrogen, etc. A multiconductor cable 23 carries all the leads from the ball bearing simulator 10 to its control panel 11 which in turn is connected to a power source in a manner to be explained.

Referring now to FIG. 2, the structure within the enclosure 15 will be described. A flat circular plate having a central aperture 26 has an upper flat surface 25 which forms a lower simulated race that is seated in a lower race holder 30. The lower race holder 30 is rotatably mounted in two sealed ball bearings 31, 31 which in turn are secured to the frame 12. The lower race holder 30 is mounted for rotation about its axis of symmetry which is coincident with a common axis 32. The spindle end 33 of the lower race holder 30 extends through the frame 12 exteriorally of the enclosure 15. A motor 34 is mounted on the frame 12 and has one end of its drive shaft 35 connected to rotate the lower race holder 30 by means of an electrically conducting flexible coupling 36. The other end of the motor drive shaft 35 has an extension 37 connected to extend into the mercury pool of a mercury cup 40 which in turn rests on the frame 12, for reasons to be explained.

The upper end of the lower race holder 30 is centrally bored to receive two ball bearings 41, 41 which rotatably support a separator disc 42 for rotation about its axis of symmetry which is coincident with the common axis 32. In the embodiment shown in FIG. 3, the separator disc 42 contains three equally spaced openings 43, 44 and 47. Each of the openings 43, 44 and 47 is adapted to receive bushings 45, 46 and 48 respectively which is pressed in place. Each of the bushings 45, 46 and 48 in turn holds a test ball element 50, 51 and 59 respectively, loosely therein. The bushings simulate the material and dimensions of the ball separator cage with which the ball elements are normally cooperative in the composite bearing. In FIG. 2, two of the test ball elements 50 and 51 are shown for purposes of explanation.

As shown in FIG. 2, an upper simulated race in the form of a flat circular plate 52 similar to that of the lower race 26 has its lower flat surface 53 resting upon the ball elements 50 and 51 as well as the other ball element not shown. An upper race holder 54 is adapted to receive and center the simulated race 52. The upper race holder 54 constitutes the main portion of the load applied to the ball elements, the remaining portion of which is provided by the upper simulated race 52. The upper race holder 54 is centered by a small guide bearing 55 which fits over the upper portion of the separator disc shaft 56 and into an insulated bushing 57 in the upper race holder 54.

A bridge 60 is fastened to the top of the upper race holder 54 and contains a slot in its upper portion which accepts a positioning tongue 61 that in turn is fastened to the lower end of a torque resisting spring 62. The bridge 60 and tongue 61 form an indexing device for initially aligning the upper race holder 54 with respect to a predetermined position in a manner to be described. The upper end of the spring 62 is connected to a zero adjusting knob 63 which extends through a hole 64 in an arm 65. A screw 66 locks the adjusting knob 63 in position. The other end of the arm 65 contains a hole 70 in order that the arm 65 may slide vertically on the post 71 which in turn is firmly held in an insulated bushing 72 that is pressed into the frame 12. A screw 73 locks the arm 65 in position.

The upper race holder 54 has damping paddles 74 and 75 removably attached to opposite sides thereof. The paddles 74 and 75 extend into a viscous damping fluid 76 contained in a circular tank 77 which in turn is mounted on the frame 12. The paddles 74 and 75 cooperating with the viscous fluid 76 provide a damping action which prevents the upper race holder 54 from swinging wildly. A pointer 80 is attached to the upper race holder 54 and cooperates with a scale 81, shown more clearly in FIG. 1, engraved on the outside of the tank 77 to provide an indication of the displacement of the upper race holder 54 from a predetermined position which is representative of a damped value of the average torque in a manner to be described.

As shown more clearly in FIG. 1, an electrical contact 82 is attached to the opposite side of the upper race holder 54 and moves adjacent another portion of the tank 77. A cooperating adjustable electrical contact 83 is slotted so that it can be slid along the tank rim to any desired position and locked in that position in order that the contact 82 will abut the contact 83 at a preset value of torque for reasons to be explained. The contacts 82 and 83 form a portion of the control circuit of FIG. 4.

The embodiment of the control circuit of the present invention shown in FIG. 4 consists essentially of an A.C. maintaining circuit for the heaters 16 and the drive motor 34 with an auxiliary battery operated shutoff circuit which automatically disconnects the heaters 16 and the motor 34 when the torque exceeds a preset value as determined by the spacing of the contacts 82 and 83. Power is supplied by an alternating current source 85 through a main switch 86 including a fuse to a pilot light indicator 87. With the push button 90 closed momentarily, a relay 91 is energized and the circuit is maintained by the closing of the normally open relay contact which energizes the heaters 16 and the thermostat 17. A pilot light 94 indicates when the heaters 16 are energized.

Closing the motor switch 95 also completes the auxiliary battery circuit and charges a condenser 96. When the shut-off contacts 82 and 83 are momentarily closed by a torque exceeding the preset value, the condenser 96 is discharged. Subsequent separation of the contacts 82 and 83 permits the condenser 96 to recharge. The recharging current actuates the sensitive relay 97 which in turn opens the A.C. maintaining circuit thereby disconnecting the heaters 16, the motor 34, etc.

To provide for the measurement of the electrical resistance of the oil film existing at the contact area where the balls 50, 51 and 59 contact the lower and upper races 26 and 52, an electrical circuit is provided which includes a meter 98. The circuit is made from the meter 98 to the mercury cup 40, the motor drive shaft 35, the flexible coupling 36, lower race holder 30, lower simulated race 26, ball elements 50, 51 and 59, upper simulated race 52, upper race holder 54, bridge 60, tongue 61, spring 62, arm 65, post 71 and back to the meter 98. The meter 98 provides an electrical resistance measurement representative fo the condition of the ball-race surfaces and the lubricant between them which is utilized to forecast bearing life.

In operation, the flat surfaces 25 and 53 of the lower and upper simulated races 26 and 52 respectively have a predetermined finish simulating that of the races of the composite bearing with which the ball elements 50, 51 and 59 are usually cooperative. The bushings 45 and 46 are also of a material and size simulating the separator cage of the composite bearing. The combined weight of the simulated race 52 and the upper race holder 54 is calculated to apply a predetermined load to the ball elements 50, 51 and 59 representative of their normal operating pressure.

The upper race hold 54 is manually rotated until the index 80 is adjacent a predetermined graduation on the scale 81. The zero adjusting knob 63 is adjusted to position the tongue 61 until it is aligned with the slot in the bridge 60 and there is zero resilient torque applied by the spring 62. The contact 83 is then positioned along the rim of the tank 77 as a function of a preset torque.

With the initial adjustments made, the main switch 86 is closed and the thermostat 17 is set at a predetermined temperature thereby energizing the heaters 16. Closing the motor switch 95 energizes the motor 34 which rotates the lower race holder 30 and the lower simulated race 26 at the motor speed. As a result, the separator disc 42 rotates at one-half of the motor speed and the caged balls 50, 51 and 59 orbit around the axis 32 at one-half of the motor speed. In doing so, the ball elements 50, 51 and 59 roll about their own centers at a speed that depends upon their chosen track radius which is selected to simulate the conditions which the ball elements would normally experience in the composite bearing. Centrifugal force causes the ball elements 50, 51 and 59 to press against the bushings 45, 46 and 48 respectively and thus simulate actual bearing conditions.

Torque is transmitted through the ball elements 50, 51 and 59 to the upper simulated race 52 and its race holder 54 tending to cause the upper race holder 54 to rotate. This rotation is restrained by the torque resisting spring 62 until an equilibrium is established where the torque transmitted to the upper race holder 54 is balanced by the counter torque applied by the spring 62. The displacement of the upper race holder 54 from its predetermined initial position is therefore a measure of the torque applied thereto which is read on the scale 81 by means of the pointer 80.

From the above description, it will be appreciated that the following parameters are simulated in the above device:

(1) Contact pressure of the bearing ball on the associated race.
(2) Rubbing speed of the ball on the separator cage.
(3) Ratio of roll to spin of the ball.
(4) Temperature.
(5) Atmosphere.
(6) Method and quantity of lubrication.

Some of the variables which may be adjusted to achieve such simulation are:

(1) Applied load
(2) Drive motor speed
(3) Track radius
(4) Ball diameter

Lubrication can be supplied to the cage bushings in any manner but it is normally limited to a small weighed quantity either applied directly to the inner bushing surface or impregnated into the pores of the bushing material by vacuum pressure methods.

In some cases the exact degree of lubrication of a particular bearing is simulated by using a quantity of lubricant proportional to the respective lubricated surfaces of the ball bearing simulator and the bearing under study. At other times the amount is deliberately limited in order to shorten the test time to failure. Such limitation can be safely utilized only in the those cases where a lubricant failure is involved, but since such failures predominate in the absence of lubricant supply systems, the practice is extremely useful.

An increase in load, temperature, etc. invites qualitatively invalid results, i.e., fatigue may occur, the oil may evaporate, etc. The failure incurred may be of a different character. Limitation of lubrication produces a result that is only quantitatively invalid. Such a result lends itself to correlation whereas the previous examples do not.

During the test run, information about over-all operational efficiency and the condition of the lubricant and bearing surfaces is obtained from the torque measurement and the electrical resistance indication. Relying upon one or both of the aforementioned outputs, the ball bearing simulator 10 can be utilized in a number of ways:

(1) For short term observation of operational efficiency as indicated by the magnitude and constancy of the torque and electrical resistance readings. Used in this way the ball bearing simulator 10 is essentially a lubricity tester. Its advantage over other lubricity testers lies in its accurate simulation of ball bearing operating conditions.

(2) As a life tester, where ball bearing parameters are simulated, life could be expected to be of about the same duration as the simulated bearing. Any attempt to hurry failure by making conditions more severe, runs the risk of altering the character of the test so that the results produced are spurious. However, the following section describes methods of shortening test time that have little effect on the validity of the results.

(3) The ball bearing simulator 40 lends itself to life tests of short duration while retaining all of the significant conditions typical of a particular simulated bearing:

(a) By observing early deleterious changes in operational efficiency which forecast catastrophic failure far in advance.

(i) Typical torque versus time curves show a period of run-in accompanied by torque decrease, then a stable period of low torque followed by a prolonged period of torque rise accompanied by increased instability. Failure is signaled by setting the automatic torque shut-off device to permit a small but often arbitrary torque increase over the initial value.

(ii) The electrical resistance measured between simulated races is a function of lubricant film thickness and hence also of the hydrodynamic film generating factors: speed and viscosity. With load and speed held constant, electrical resistance reflects viscosity. As the life test proceeds, deterioration of the lubricant film through polymerization, evaporation of light fractions, etc. manifests itself in higher viscosity and a generally increasing value of electrical resistance. Such deterioration can be detected very early in the test. Later in the test, electrical resistance readings become erratic as a result of film breakdown. This point also may be used as a forecast of approaching failure.

(b) By limiting the quantity of lubricant so that only a portion of the total life test is required to be conducted. If such a test is run under simulated conditions, the character of the test is not significantly altered and the results may therefore be safely correlated with the life of a more copiously lubricated bearing.

(c) By a combination of (a) and (b).

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. A rolling bearing simulator for rolling bearing elements comprising first and second spaced surface providing means between which a plurality of said rolling bearing elements are disposed, said first and second surface providing means being mounted for rotation about a common axis, rolling bearing element retaining means adapted to receive a plurality of said elements and disposed between and in spaced coaxial relation with respect to said first and second surface providing means, said bearing element retaining means simulating the separator cage with which said elements are normally cooperative, said bearing element retaining means being rotatably mounted for rotation about said common axis with respect to said surface providing means, means for rotating said first surface providing means with respect to said second surface providing means, and means responsive to the torque transmitted by means of said elements to said second surface providing means for providing a measure in accordance with a function thereof.

2. A rolling bearing simulator for rolling bearing elements comprising first and second spaced surface providing means between which a plurality of said rolling bearing elements are contiguously disposed with respect to said surfaces, said surfaces having a predetermined finish generally simulating that of the bearing races with which said elements are normally cooperative, said first and second surface providing means being mounted for rotation about a common axis, said rolling bearing elements and said spaced surfaces having a lubricant therebetween, rolling bearing element retaining means adapted to receive a plurality of said elements and disposed between and in spaced coaxial relation with respect to said first and second surface providing means, said bearing element retaining means simulating the separator cage with which said elements are normally cooperative, said bearing element retaining means being rotatably mounted for rotation about said common axis with respect to said surface providing means, means for rotating said first surface providing means with respect to said second surface providing means, means responsive to the displacement of said second surface providing means for providing a measure of the torque transmitted through said elements to said second surface providing means, and electrical circuit means connected to said first and second surface providing means for continuously providing a signal representative of the electrical resistance through said lubricant, said first and second surface providing means, and said elements.

3. A simulator as described in claim 2 in which said element retaining means includes a plurality of bushings, each of which is adapted to receive one of said elements and is of a material generally simulating that of the separator cage with which said elements are normally cooperative.

4. A ball bearing simulator for ball bearing elements comprising first and second spaced flat race simulating surfaces between which a plurality of said ball elements are contiguously disposed with respect to said surfaces, said surfaces having a predetermined finish generally simulating that of the bearing races with which said ball elements are normally cooperative, said first and second surfaces being mounted for rotation about a common axis, said ball bearing elements and said spaced surfaces having a lubricant therebetween, ball element retaining means adapted to receive a plurality of said ball elements and disposed between and in spaced coaxial relation with respect to said first and second surfaces, said ball element retaining means simulating the separator cage with which said elements are normally cooperative, said ball element retaining means being rotatably mounted for rotation about said common axis with respect to said surfaces, said retaining means simulating the ball separator cage with which said ball elements are normally cooperative, means for rotating said first surface with respect to said second surface about said common axis, means responsive to the movement of said second surface for providing a measure of the torque transmitted through said ball elements to said second surface, and means including means connected to said first and second surfaces for providing an electrical circuit through said lubricant, said first and second surfaces, and said ball elements for providing a signal representative of the electrical resistance therethrough.

5. A simulator as described in claim 4 in which said ball element retaining means includes a plurality of bushings, each of which is adapted to receive one of said ball elements and is of a material and size to simulate the ball separator cage with which said ball elements are normally cooperative.

6. A simulator as described in claim 4 in which said ball element retaining means is arranged to rotate the ball elements to roll about their own centers at a speed that depends upon their chosen track radius which is selected to simulate the conditions which the ball elements would normally experience in a composite bearing assembly.

7. A simulator as described in claim 4 further including resilient restraining means resiliently coupled to said second surface for providing a resilient counter torque whereby the displacement of said second surface from a predetermined position is representative of the torque transmitted through said elements to said second surface, and indicating means connected to said second surface for providing a measure of said displacement.

8. A ball bearing simulator for ball bearing elements comprising a first lower race simulating member having a first flat upper surface, said first member being mounted for rotation about its axis of symmetry with its upper surface substantially horizontal, a second upper race simulating member having a second flat lower surface in space relation and opposing said upper surface, said second member being rotatably mounted about its axis of symmetry, a separator disc disposed in spaced relation between said upper and lower members and rotatably mounted with respect to said upper and lower members about its axis of symmetry, said axes of symmetry being coincident, said disc having a plurality of bushings therein each adapted to receive one of said ball elements, each of said bushings being of a material and size to simulate the separator cage with which said ball elements are normally cooperative, said second upper member being adapted to rest upon said ball elements whereby rotation of said first lower member transmits a torque to said second upper member by means of said ball elements therebetween, a predetermined inertia mass mounted on said second upper member, resilient means associated with said inertia mass for resiliently restraining said mass in the presence of torques, damping means associated with said mass for damping the movement thereof, indicator means cooperative with said inertia mass for providing a measure representative of the movement of said mass from a predetermined position, and drive means for rotating said first lower member.

9. A ball bearing simulator for ball bearing elements comprising a frame, a first simulated race having a first flat surface, a second simulated race having a second flat surface, said surfaces having a finish simulating that of the bearing races with which said ball elements are normally cooperative, a first race holder adapted to receive said first simulated race and mounted for rotation about a first axis on said frame, a second race holder adapted to receive said second simulated race, said first and second flat surfaces being disposed in spaced relation and opposing each other, separator disc means disposed in spaced relation between said first and second simulated races and rotatably mounted on said first race holder about said first axis, said disc means being adapted to receive a plurality of said ball elements, said second race holder being mounted for rotation on said disc means about said first axis, said second simulated race and race holder being adapted to rest upon said ball elements by means of said second flat surface, said ball elements in turn being adapted to rest upon said first flat surface whereby rotation of said first race holder transmits a torque to said second race holder by means of said ball elements therebetween, said first and second race holders, first and second simulated races and said separator disc means having their axes of symmetry coincident with said first axis, said second race holder and second simulated race having a predetermined combined mass for applying a predetermined load to said ball elements, said ball bearing elements and said spaced surfaces having a lubricant therebetween, drive means for rotating said first race holder, means responsive to the movement of said second race holder for providing a measure of the torque transmitted thereto, and means including means connected to said first and second simulated races for providing an electrical circuit through said lubricant, said first and second simulated races and said ball elements for providing a signal representative of the electrical resistance therethrough.

10. A simulator as described in claim 9 in which said ball element retaining means is arranged to rotate the ball elements to roll about their own centers at a speed that depends upon their chosen track radius which is selected to simulate the conditions which the ball elements would normally experience in a composite bearing assembly.

11. A simulator as described in claim 9 in which said separator disc means includes a plurality of bushings, each of which is adapted to receive one of said ball elements and is of a material and size to simulate the ball separator cage with which said ball elements are normally cooperative.

12. A simulator as described in claim 11 in which said first and second simulated races and said bushings are respectively interchangeable.

13. A simulator as described in claim 9 further including spring restraining means resiliently coupled to said second race holder for providing a resilient counter torque whereby the displacement of said second race holder from a predetermined position is representative of the torque transmitted through said ball elements to said second race holder, and indicating means connected to said second race holder for providing a measure of said displacement.

14. A simulator as described in claim 13 in which said spring restraining means has one end adjustably connected to said frame and its other end connected to an indexing device that is cooperative with said second race holder for initially aligning said second race holder to said predetermined position with zero initial spring force.

15. A simulator as described in claim 14 in which said drive means includes a motor having one end of its drive shaft coupled to said first race holder and the other end of its drive shaft extending into a mercury pool mounted on said frame, and said electrical circuit is formed through said mercury pool, motor drive shaft, first race holder, first simulated race, ball elements, second simulated race, second race holder, indexing device, and spring restraining means.

16. A simulator as described in claim 13 further including damping means connected to said second race holder for damping the movement thereof.

17. A method of simulating rolling bearing operation for forecasting bearing operation including the steps of placing a plurality of test ball elements between first and second spaced race simulating members, retaining said ball elements in a retaining means which simulates the separator cage with which said ball elements are normally cooperative and locates said ball elements at a radius which causes said ball elements to rotate at a speed which said ball elements experience under actual operating conditions, applying a predetermined quantity of lubrication to said ball elements correlated with the type of test to be run, applying a predetermined loading to said ball elements, initially aligning said second race simulating member with respect to a predetermined position, rotating said first race simulating member thereby transmititng a torque through said ball elements to said second race simulating means, applying a resilient counter torque to said second race simulating member, measuring the displacement of said second race simulating member from said predetermined position, and measuring the electrical resistance through said lubricant, said first and second race simulating members and said ball elements.

References Cited in the file of this patent

UNITED STATES PATENTS

| | | |
|---|---|---|
| 2,337,414 | Reieber | Dec. 21, 1943 |
| 2,785,566 | Mims | Mar. 19, 1957 |
| 2,808,563 | Hornbostel | Oct. 1, 1957 |
| 2,867,113 | Mims | Jan. 6, 1959 |
| 2,972,881 | Koch | Feb. 28, 1961 |
| 3,041,867 | Knudsen | July 3, 1962 |

FOREIGN PATENTS

| | | |
|---|---|---|
| 728,667 | Germany | Dec. 2, 1942 |